US009914648B2

(12) United States Patent
Ohara et al.

(10) Patent No.: US 9,914,648 B2
(45) Date of Patent: Mar. 13, 2018

(54) PROCESS FOR PRODUCING HEMATITE FOR IRONMAKING

(71) Applicant: SUMITOMO METAL MINING CO., LTD., Tokyo (JP)

(72) Inventors: Go Ohara, Tokyo (JP); Yasumasa Kan, Tokyo (JP); Masaki Imamura, Tokyo (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 112 days.

(21) Appl. No.: 14/900,806

(22) PCT Filed: Jun. 3, 2014

(86) PCT No.: PCT/JP2014/064695
§ 371 (c)(1),
(2) Date: Dec. 22, 2015

(87) PCT Pub. No.: WO2015/001893
PCT Pub. Date: Jan. 8, 2015

(65) Prior Publication Data
US 2016/0152487 A1    Jun. 2, 2016

(30) Foreign Application Priority Data

Jul. 3, 2013   (JP) .................................. 2013-140094

(51) Int. Cl.
*C01G 49/00* (2006.01)
*C01G 49/06* (2006.01)
(Continued)

(52) U.S. Cl.
CPC .............. *C01G 49/06* (2013.01); *B03C 1/002* (2013.01); *B03C 1/025* (2013.01); *B03C 1/30* (2013.01);
(Continued)

(58) Field of Classification Search
CPC ......... C01G 49/06; B03C 1/002; B03C 1/025; B03C 1/30; C22B 7/005; C22B 7/006; C22B 23/0407
(Continued)

(56) References Cited

U.S. PATENT DOCUMENTS 5,316,746 A    5/1994   Narita
7,964,165 B2   6/2011   Nakai
(Continued)

FOREIGN PATENT DOCUMENTS

CA    2 678 724        3/2010
JP    62254851 A      11/1987
(Continued)

OTHER PUBLICATIONS

Interational Search Report dated Jul. 4, 2014.
International Search Report.
Japanese Office Action.

*Primary Examiner* — Steven Bos
(74) *Attorney, Agent, or Firm* — Gerald E. Hespos; Michael J. Porco; Matthew T. Hespos

(57) ABSTRACT

A process is provided for obtaining a hematite-containing material that can be used for ironmaking. The process includes separating a leach residue from a hydrometallurgical refining plant into an overflow and an underflow using a wet cyclone under a condition that the wet cyclone is adjusted to have a setting between 1 μm or less and 2 μm or less as a classification particle size for the overflow. The process then includes separating the overflow into a strong magnetic substance and a weak magnetic substance using a strong-magnetic-field magnetic separator under a condition that magnetic field intensity is 5 to 20 [kGauss]. The process then includes using a superheated steam drying system for
(Continued)

adjusting a moisture content of the strong magnetic substance after the separation, to be 10 wt % to 17 wt %.

4 Claims, 2 Drawing Sheets

(51) Int. Cl.
| | |
|---|---|
| *B03C 1/00* | (2006.01) |
| *B03C 1/025* | (2006.01) |
| *B03C 1/30* | (2006.01) |
| *C22B 7/00* | (2006.01) |
| *C22B 3/00* | (2006.01) |
| *B01D 21/26* | (2006.01) |

(52) U.S. Cl.
CPC .......... *C22B 7/005* (2013.01); *C22B 23/0407* (2013.01); *B01D 21/267* (2013.01); *B03C 2201/18* (2013.01); *B03C 2201/22* (2013.01); *Y02P 10/212* (2015.11)

(58) Field of Classification Search
USPC .................. 423/138, 150.3, 151; 209/39
See application file for complete search history.

(56) References Cited

U.S. PATENT DOCUMENTS

| | | | |
|---|---|---|---|
| 8,708,152 | B2 | 4/2014 | Lehtinen |
| 2015/0284820 | A1 | 10/2015 | Hattori |
| 2016/0024614 | A1 | 1/2016 | Matsubara |
| 2016/0076121 | A1 | 3/2016 | Ohara |
| 2016/0340201 | A1 | 11/2016 | Ohara |
| 2016/0362304 | A1 | 12/2016 | Ohara |

FOREIGN PATENT DOCUMENTS

| | | |
|---|---|---|
| JP | 2010-95788 | 4/2010 |
| JP | 2012-532994 | 12/2012 |
| JP | 2013-95971 | 5/2013 |
| WO | 2007099714 A1 | 9/2007 |
| WO | 2011/006223 | 1/2011 |

PROCESS FOR PRODUCING HEMATITE FOR IRONMAKING

BACKGROUND

1. Field of the Invention

The present invention relates to a process for producing hematite for ironmaking.

2. Description of the Related Art

More particularly, the present invention relates to a technique for separating a tailings slurry obtained after a nickel oxide ore is treated though a final neutralization step according to a high pressure acid leach (HPAL) process in a hydrometallurgical refining plant, thereby recovering hematite for ironmaking.

Nickel has been widely used as a raw material of stainless steel, but in accordance with the tendency of depletion of a sulfide ore that becomes a raw material of nickel, a technology of refining a low-grade oxide ore has been developed and has been into practical use.

Specifically, a producing process called a "high pressure acid leach (HPAL)" process has been put into practical use, in which process a nickel oxide ore such as limonite and saprolite is put into a pressurizing apparatus such as an autoclave in combination with a sulfuric acid solution, and nickel is leached under a high temperature of approximately 240° C. to 300° C. and a high pressure. FIG. 3 illustrates a schematic flowchart of the producing process.

A neutralizing agent is added to nickel that is leached in the sulfuric acid solution in the HPAL process so as to neutralize a surplus acid, and then nickel is subjected to solid-liquid separating treatment so as to be separated as a leach residue.

Then, the nickel is recovered as an intermediate raw material in a type of a hydroxide, a sulfide, and the like through a process of separating impurities, and the intermediate raw material is further refined to obtain nickel metal, nickel salt compound, and the like.

In a process of neutralizing the surplus acid, pH of a leach substance is adjusted to be appropriate for the solid-liquid separation, and then in a solid and liquid separation process that is a subsequent process, concentration of a solid content and solid and liquid separation are performed in a facility called counter current decantation (CCD). Typically, in CCD, a plurality of continuous stages of thickeners are used.

A liquid component (hereinafter, may be referred to as an overflow), which is obtained from CCD, is returned to a neutralization process for adjustment of pH that is appropriate for a sulfurization process. In the neutralization process, pH is adjusted so as to remove a fine solid content, which occurs, through precipitation. Then, for example, the liquid component is subjected to a sulfurization treatment, whereby an intermediate raw material such as a nickel sulfide is obtained.

Employing the HPAL process makes it possible to leach nickel almost completely, for example, in the case of nickel oxide ore, even in a low grade ore in which a target valuable metal to be recovered is contained in an amount of 1% by weight to 2% by weight (hereinafter, the weight will be expressed by "%"). Accordingly, a target metal is concentrated to the same extent as in a conventional raw material, and the target metal can be obtained through substantially the same refining method and refining process as in the conventional raw material. In addition, the HPAL process is applicable to not only the nickel oxide ore but also different raw materials, such as a nickel sulfide ore, a copper sulfide ore, and a copper oxide ore.

In addition, a main component of the leach residue that is obtained in the HPAL process is an iron oxide, and iron in the solid-content leach residue is approximately 40 to 50%. In addition, an amount of the leach residue that is produced is approximately 50 times to 100 times an amount of the intermediate raw material that is produced. The reason for this is that each of the nickel oxide ore or the sulfide ore that is a raw material contains iron in an amount much more than that of nickel.

The leach residue is generated at a high temperature, and is in a type of a chemically and environmentally stable oxide, but has no particular utility value in a current state, and is accumulated and stored in residue accumulation grounds.

Therefore, a broad residue disposal yard is necessary for scrap and storage of an enormous amount of the leach reside which is generated in accordance with the HPAL process operation.

By the way, many of the iron oxide is contained in an iron ore and the iron ore is widely used as a raw material for refined steel.

In iron and steel refining, the following process is used. An iron ore containing an iron oxide is charged into a blast furnace in combination with a reducing agent such as cokes, and the iron ore is reduced and melted through heating, thereby forming crude steel. The crude steel is refined in a converter furnace so as to manufacture target steel.

Typically, the iron ore as the raw material is a limited resource, and availability of an iron ore with good quality that is necessary for quality maintenance of steel becomes gradually difficult. Accordingly, an examination has been made with respect to use of the leach residue as the iron ore.

However, the leach residue in the HPAL process cannot be directly used for a raw material for ironmaking from the following reasons.

The leach residue in the HPAL process contains vein stone or impurities, particularly sulfur, in addition to the iron oxide, and thus the leach residue is not appropriate for a raw material that is used in an iron producing process in the related art. Specifically, the sulfur content is high.

Particularly, the sulfur content in the iron oxide which can be used for a raw material for ironmaking is different depending on facility capacity, an amount of production, and the like in individual ironworks. However, typically, it is necessary to suppress the sulfur content to less than 1%.

On the other hand, the solid-content leach residue contains approximately 5% to 8% of sulfur. However, the majority of sulfur in the leach residue is derived from calcium sulfate (so-called gypsum) that is mixed in during the HPAL process.

When neutralizing free sulfuric acid (the free sulfuric acid is sulfuric acid that remains without reaction in the sulfuric acid that is excessively added for performing sufficient leaching in the HPAL process), which remains in leach slurry that is obtained during high-pressure acid leaching, an inexpensive calcium-based neutralizing agent which is usually used, for example, limestone or slaked lime is added. Accordingly, when calcium contained in the neutralizing agent and the free sulfuric acid react with each other, the gypsum is generated, and is mixed into the leach residue.

A part (approximately 1%) of sulfur that is contained in the solid-content leach residue is trapped inside particles of hematite that is generated.

The solid content in the residue after nickel leach obtained at this point is mainly constituted by hematite having a particle size of approximately 1 μm, and the solid content contains the iron content of approximately 30 to 40% and the sulfur content of approximately 5 to 8%. The moisture content of the leach residue obtained at this point is 60%.

In order to use the leach residue as the hematite for ironmaking, it is necessary to achieve the iron grade of 50% or more and the sulfur grade of 1% or less in the solid-content leach residue.

As a technique to achieve this, for example, JP 2010-095788 A discloses a technique for removing impurities contained in a mixture of hematite by separating a leach residue by sieve classification, wet-cyclone separation, and magnetic separation, and the technique has been recognized to have some effect on removal of impurities contained in hematite.

However, the process is not enough to use the leach residue after the physical separation alone as hematite for ironmaking as described above, and in particular, the iron content only increases to approximately 40 to 45% at most. Accordingly, in order to use such a leach residue as hematite for ironmaking, it was necessary to mix with a raw material for ironmaking which contains a higher grade of iron. The moisture content of the leach residue obtained by physical separation is approximately 40%.

Furthermore, even though such reduction of sulfur grade is achieved, performing dehydration using a typical filter press or the like causes a problem of liquefaction during a transfer process, since moisture of approximately 22% is contained in the resultant residue after nickel leach (hematite cake).

In order to remove the moisture contained in the residue, there are various methods including sun-drying, heating, roasting, or centrifugal separation. However, when the moisture is excessively reduced, there are problems that dust is generated and thus transfer handling becomes difficult.

Therefore, a method of reducing such moisture to an optimum level and having operational efficiency has been required.

SUMMARY

The present invention has been made to solve these problems to propose a process of separating a leach residue that can obtain a hematite-containing material capable of being used as a raw material for ironmaking and hardly causes transfer troubles, and to provide a process for producing hematite for ironmaking from the leach residue.

The present inventors have found a process capable of solving problems of the iron content and the sulfur content at the same time by sequentially performing a wet cyclone separation step and a proper magnetic separation step, and capable of suppressing efficiently transfer troubles by applying a further appropriate dehydration process, whereby the present invention has been made.

A first aspect of the present invention is a process for producing hematite for ironmaking, that utilizes a leach residue as a raw material, the leach residue being obtained from a hydrometallurgical refining plant where a nickel oxide ore is treated by a high pressure acid leach process, and the process being characterized by including, at least the following three steps: a separation step of the leach residue into an overflow and an underflow by a wet cyclone under the condition that the wet cyclone is adjusted to have a setting between 1 µm or less and 2 µm or less as a classification particle size for the overflow; a physical separation step of the overflow into a strong magnetic substance and a weak magnetic substance with magnetic force using a strong-magnetic-field magnetic separator under a condition that magnetic field intensity is 5 to 20 kGauss; and a dehydration step of a superheated steam drying system of adjusting a moisture content of the strong magnetic substance of the overflow after the physical separation, to be 10% to 17%, thereby producing a hematite cake.

A second aspect of the present invention is characterized in that: the moisture content of the strong magnetic substance of the overflow after the physical separation, which is used in the dehydration step of the first aspect, is 35% to 45%; and a pressure of superheated steam in the superheated steam drying system is 0.5 to 0.7 MPa and a temperature of the superheated steam is 150 to 180° C.

According to the process for producing hematite for ironmaking of the present invention, it is possible to easily obtain a hematite-containing material having a grade capable of being used as a raw material for ironmaking from a refining process for an oxide ore, to effectively suppress transfer troubles, and thus to achieve remarkably industrial effects.

DETAILED DESCRIPTION OF EMBODIMENTS

A process for producing hematite for ironmaking according to the present invention will be described in detail below with reference to the drawings.

Figure 1:
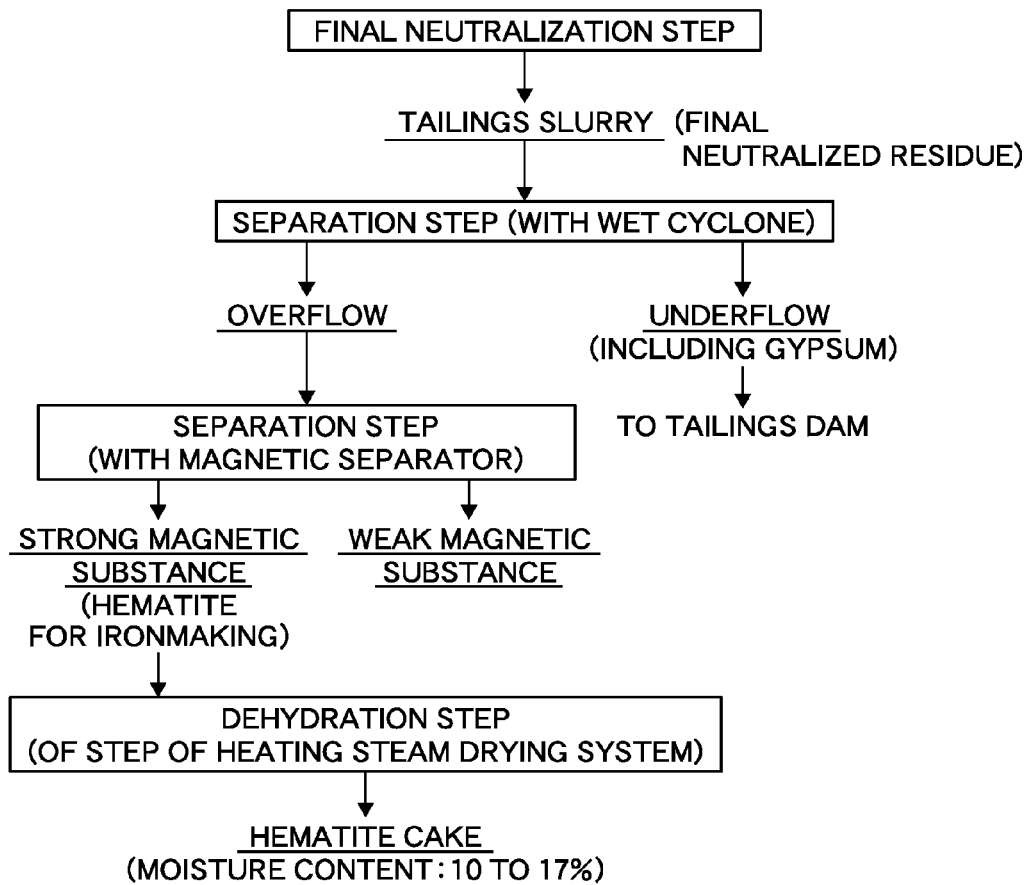
FIG. 1 is a flowchart of a producing process of producing hematite for ironmaking from a tailings slurry according to the present invention.
Figure 2:
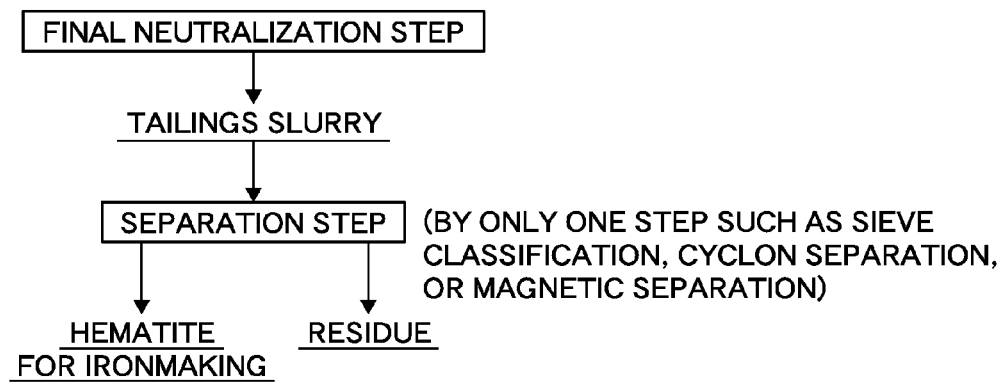
FIG. 2 is a flowchart of a conventional producing process of producing hematite for ironmaking from a tailings slurry.

FIG. 1 is a flowchart of a producing process of hematite for ironmaking according to the present invention.

Figure 3:
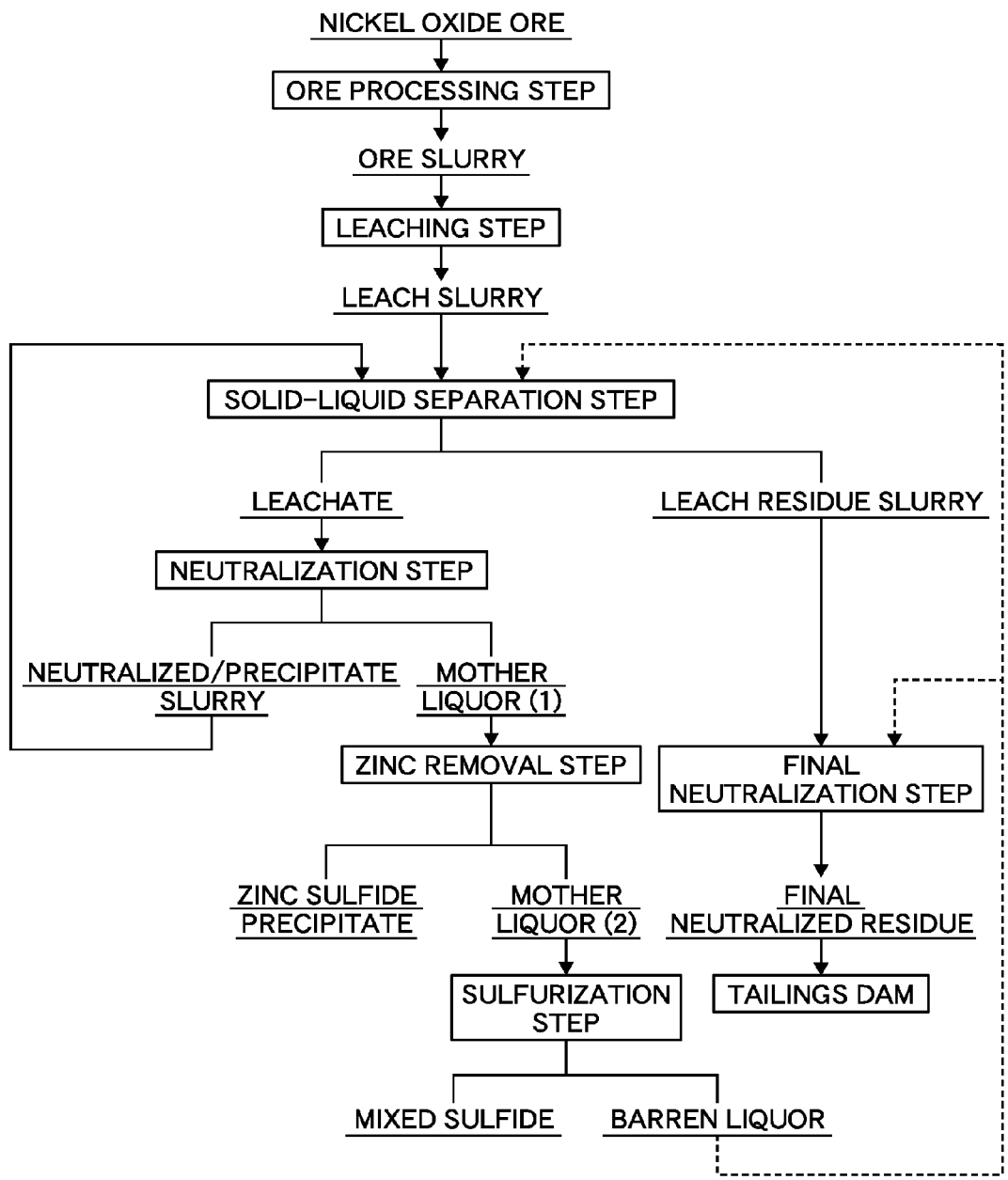
FIG. 3 is a schematic flowchart of a producing process according to an HPAL process.

The present invention is to separate a material having a useful component composition from a leach residue (hereinafter, referred to as "a final neutralized residue (a tailings slurry)" stored in a "tailings dam" as illustrated in FIG. 3) that is discharged from a hydrometallurgical refining plant where a nickel oxide ore is subjected to a high pressure acid leach (HPAL) process as illustrated in the schematic flowchart of a producing process of the HPAL of FIG. 3.

The process is characterized by sequentially performing at least three steps including in order: a step of separating tailings slurry, which is the leach residue, into an overflow and an underflow using a wet cyclone; a step of separating the separated overflow into a strong magnetic substance (hematite for ironmaking) and a weak magnetic substance using magnetic force; and a dehydration step of a superheated steam drying system of adjusting a moisture content of the strong magnetic substance of the overflow after the physical separation using the magnetic force, to be 10% to 17%, wherein a strong-magnetic-field magnetic separator is used in the step of separating using magnetic force.

Therefore, it is possible to obtain hematite for ironmaking with a high iron grade and a low sulfur grade, which has the iron grade of approximately 53% by weight and the sulfur (S) grade of approximately 1%, from the leach residue containing, for example, iron of 30 to 35% and sulfur (S) of 3 to 10%.

Such hematite having the content of these compositions can be provided for ironmaking by itself, and is easily used with a great adjustment margin even when being used by mixing with other raw materials for iron material.

In solid contents of the leach residue in the HPAL process, the iron and sulfur are contained in the form of hematite and gypsum, respectively.

The particle size of the hematite is, for example, approximately 1 μm and the particle size of the gypsum is approximately 30 μm; and the hematite has weak magnetism and the others have no magnetism.

In the present invention, such a leach residue is charged into a wet cyclone and the gypsum having the large particle size is mostly removed as an underflow. The hematite having the small particle size is concentrated in the overflow.

Then, the resultant overflow is subjected to a physical separation treatment using a "strong-magnetic-field magnetic separator" which is magnetizable enough to separate the hematite and chromite from each other.

Magnetic force to be used in typical magnetic separation is at most approximately 2000 [Gauss]. However, for example, for a "strong-magnetic-field magnetic separator" used in Examples, very strong magnetic force can be applied thereto since a method is employed in which magnetic force is applied when powders pass through a mesh. The mesh is set to have optimum apertures for the powders to be separated.

These configurations makes it possible to separate hematite and chromite, which cannot be substantially separation in the typical magnetic separation. In addition, since the small amount of remaining gypsum has no magnetism, it can be separated from the hematite.

As a result, ultimately, hematite for ironmaking is recovered which contains iron of approximately 53% by weight and sulfur of approximately 1% by weight as discharge substances (magnetized substances) on a magnetic body side of a magnetic separator.

As described above, the process for producing the hematite for ironmaking according to the present invention has a first feature that the separation is performed by the wet cyclone at first and subsequently physical separation is performed by the strong-magnetic-field magnetic separator which can apply a magnetic force capable of separating hematite and chromite from each other. In this process, however, when the separation step by the wet cyclone and the physical separation step by the strong-magnetic-field magnetic separator are merely simply combined with each other, for example, when the steps are performed in a reverse order to the above order, it is difficult to effectively recover the hematite for ironmaking.

More particularly, this is because that when the separation step by the strong-magnetic-field magnetic separator is performed at first, it is difficult to apply the magnetic force enough to separate hematite and chromite having a small particle size because of the presence of gypsum having greatly different particle sizes.

In addition, the separation becomes difficult depending on a process for applying magnetic force of the strong-magnetic-field magnetic separator used. For example, in the "strong-magnetic-field magnetic separator" which is also used in Examples employing a process for applying the magnetic force when the powders pass through the mesh, the gypsum having a large particle size clogs the mesh immediately after operation and thus the separation treatment does not proceed.

In the process for producing hematite for ironmaking according to the present invention, the separation is first performed by the wet cyclone in such a manner that a classification particle size is set to be in an appropriate range.

Then another separation is performed using the magnetic force of which magnetic field intensity is set to be an appropriate range.

In this regard, as a setting of the classification particle size of the wet cyclone, first, the setting for overflow may be appropriately adjusted according to the particle sizes of hematite and gypsum that are contained therein, but the wet cyclone is preferably adjusted so that the classification particle size for overflow is set to be in a setting range from 1 μm or less to 2 μm or less.

In particular, since hematite and gypsum contained in the solid content of a leach residue have generally the particle sizes of approximately 1 μm and approximately 30 μm, respectively, the classification effect by the wet cyclone can be improved in the above range, the leach residue being obtained in such a manner that the nickel oxide ore is subjected to a wet-refining treatment according to the HPAL process and then is treated in a final neutralization process.

Moreover, when the separation is performed using the magnetic force, the magnetic field intensity has preferably a condition of 10 to 15 kGauss, which can be obtained by adjusting a mesh size and load power.

Basically, it is preferable that the magnetic field intensity be strong. The reason is that the hematite is insufficiently separated when the magnetic field intensity is less than 5 kGauss. In addition, when the magnetic field intensity is larger than 20 kGauss, further effects are not expected and it is also not preferable in terms of economy.

On the other hand, in the leach residue that is obtained by a physical separation process in the producing process of the present invention (after the physical separation process, indicating a strong magnetic substance of overflow), the sulfur content in the solid-content leach residue is as low as less than 1%, but the moisture content thereof is as high as approximately 40%.

Typically, it is said that during transportation of a solid material, if the moisture content is high, a liquefaction phenomenon occurs during transportation by ship, and thus there is a possibility that the ship is overturned. From an investigation made by Nippon Kaiji Kentei Kyokai, a transportable moisture limit (TML) of hematite of the present invention is 17% or less. Accordingly, in the case of the transportation by ship, it is necessary to decrease the moisture content of the cake in the case of producing the hematite cake according to the invention.

In addition, a particle size of hematite is as very small as approximately 1 μm, and thus the characteristics of dust generation are extremely high under an absolute dry condition. However, when the moisture content becomes 10% or more, the characteristics of the dust generation decreases and dust prevention such as use of a flexible container during handling is not necessary. Therefore, the moisture content of hematite cake is preferably 10% to 17%. In a case where the dust prevention is possible by using the flexible container and the like during the handling, the moisture content of hematite cake may be allowed to be less than 10%.

Therefore, it is understood that the adjustment of the moisture content is preferred, but there are the following problems when dehydration is performed to remove the moisture from the leach residue obtained by physical separation (strong magnetic substance of overflow, moisture content: approximately 40%).

Generally, examples of the dehydration of the leach residue include sun-drying, heating and roasting, filter pressing, and a centrifugal separation, and the filter pressing is preferred in consideration of high moisture removing efficiency and economic efficiency. However, unless the dehydration treatment is performed several times by the high-pressure filter press (high-pressure pressurizing filtration apparatus) especially having high efficiency, it is difficult to achieve a moisture content of 17% or less.

In the case of employing the sun-drying, it is not possible to know the time required for operation due to weather and it is difficult to adjust to the preferred moisture content described above.

Furthermore, in the case of employing the heating and roasting, the dehydration excessively proceeds in many cases, and thus it is difficult to adjust to moisture of 10% or more.

Moreover, in the case of the centrifugal separation process, there is a limit in reducing the moisture content to approximately 20%.

Thus, a second characteristic of the present invention is to include a dehydration step using a superheated steam system as the dehydration.

Specifically, the moisture content of the leach residue obtained by the physical separation and subjected to the dehydration using the superheated steam system is set to be approximately 40%, and the dehydration step is performed under the following dehydration conditions of the superheated steam system: pressure of 0.5 to 0.7 MPa (6 bar); and temperature of 150 to 180° C.

As a result, the moisture content of the leach residue obtained by the physical separation can be set to be 10 to 17% by one operation.

In the dehydration step of the superheated steam system, as is widely known, a dehydrated substance comes in contact with superheated steam to heat the dehydrated substance with the superheated steam and the moisture contained in the dehydrated substance is dehydrated and dried in a state of being taken into the superheated steam at the same time.

In the present invention, the dehydrated substance is the leach residue (strong magnetic substance having the moisture content of approximately 40%) obtained from the physical separation step, and a way of contact of the dehydrated substance with the superheated steam is not particularly limited, but may include a way using a drum-type drier (in which superheated steam blows into a leach residue adhered to a cylindrical drum formed by a filter cloth) or a way using a counterflow heat exchanger (in which a leach residue supplied from the top of the drier body comes in counterflow contact with superheated steam supplied from the bottom and a baffle plate is provided in the middle of falling of the leach residue as necessary to improve contact efficiency).

However, in using the superheated steam for the dehydrated substance, it is important to define pressure and temperature of the superheated steam. That is, since a drying capacity varies depending on the pressure and the temperature of the superheated steam, the pressure and the temperature of the superheated steam are set to be in the range of pressure of 0.5 to 0.7 MPa (6 bar) and in the range of temperature of 150 to 180° C., respectively.

When the drying is performed by the pressure of the superheated steam lower than the above range, insufficient drying proceeds and the moisture content of the obtained hematite cake (hereinafter, referred to a strong magnetic substance of the overflow subjected to adjustment with water) exceeds 17%. On the contrary to this, the drying excessively proceeds at a higher pressure and the moisture content of the obtained hematite cake becomes below 10%. Moreover, it is not preferable because the cost of a pressure-resistant apparatus becomes comparatively higher.

In addition, when the drying is performed by the temperature of the superheated steam lower than the above range, insufficient drying proceeds and the moisture content of the obtained hematite cake exceeds 17%. On the contrary to this, the drying excessively proceeds at high temperature and the moisture content of the obtained hematite cake becomes below 10%. Moreover, it is not economically preferable because energy consumption increases.

On the reason for this, the inventors consider that: a starting raw material is a leach residue at a final neutralization process in a wet-refining process of a nickel oxide ore; a main component of the leach residue obtained by the physical separation to make the content of sulfur contained in the solid content to be approximately 1% or less is a hematite particle of approximately 1 µm; and when the moisture content is approximately 40%, a special effect is exhibited in combination of a two-stage process (cyclone and magnetic concentration) as a physical separation step and a dehydration process of the superheated steam system as a dehydration step.

As described above, the final neutralized residue having the moisture content of approximately 70% obtained from the final neutralization process in the wet-refining of the nickel oxide ore is treated, and thus the content of sulfur contained in the solid content is set to be 1% or less from the request of the raw material for ironmaking, the moisture content is set to be 10 to 17% from the request for a transfer, and thus the present invention is suitably used with respect to the request for one dehydration step in terms of operational efficiency.

In addition, it is preferable to granulate the hematite for ironmaking, which is manufactured by the above-described producing process, to obtain a granulated material.

In the hematite cake that is obtained in the producing process of the present invention, the following problems may occur. Specifically, the shape of the hematite cake may be not uniform; dusting may occur; and flowability may deteriorate. Accordingly, the problems may occur as follows: in a case where the hematite cake is mixed with other iron ores by an iron-producing maker, it enters a non-uniform mixed state; charging efficiency deteriorates due to the poor flowability; and dusting tends to occur. Accordingly, when a granulated material having a uniform particle size is obtained by performing the granulation, the above-described problems are solved.

For the granulation, a widely known granulation method such as rolling granulation, compression granulation, and extrusion granulation is preferably used, and thus a granulated material, which is uniform and has favorable flowability, is obtained. In addition, occurrence of dusting can be further suppressed in comparison to the hematite cake.

Furthermore, when the producing process of the present invention is applied, the entirety of sulfur derived from gypsum is removed and it is possible to obtain a hematite cake for ironmaking, in which sulfur considered to be derived from a sulfur component trapped into hematite particles in the high-temperature pressure acid leaching process remains around 1%.

Therefore, when applying the following known processes in combination, there is a possibility that the hematite can be used as a more satisfactory raw material for ironmaking.

Specifically, when applying a process of removing sulfur that remains in hematite by drying and baking a supply material so as to remove sulfur and crystal hydration water which are contained in the supply material as disclosed in JP 2012-517523 W, and a then process of briquetting an iron raw material in a powder type as disclosed in JP 2004-

269960 A, or a process of pelleting an iron raw material in a powder type as disclosed in JP 2012-211363 A, or the like in combination, it is possible to expect a more satisfactory raw material for ironmaking.

In addition, it is possible to remove sulfur in hematite particles as SOX by roasting the hematite that is obtained by the present invention at a predetermined temperature and to lower the sulfur content thereof.

Specifically, it is possible to obtain hematite in which a sulfur concentration is 0.5% or less by performing a heat treatment at 600° C. or higher. In a heat treatment at a temperature higher than 1400° C., the sulfur concentration becomes 0.05% or less, and thus the sulfur concentration obtained becomes the same as in a conventional iron ore.

It is possible to obtain hematite with a low sulfur concentration through a heat treatment at a temperature higher than 1400° C. However, when the heat treatment temperature is set to be higher, energy consumption increases, and an operational lifespan of a furnace wall material is shortened, and thus a heat treatment at 1400° C. or lower is economically preferable.

EXAMPLES

Hereinafter, the present invention will be described in more detail with reference to Examples and Comparative Examples. The common producing conditions and characteristic measuring conditions in Examples and Comparative Examples are summarized in Table 1.

TABLE 1

| Items/Conditions | |
| --- | --- |
| Tailings slurry | Solid content: 35 [wt %]<br>Treatment speed: 400 [t/hr]<br>Component in solid content: Fe/35%, S/7%<br>Particle size: hematite(1 μm), gypsum (30 μm) |
| Wet cyclone | "Model Number SC224-P" manufactured by SOLDER CYCLON CORPORATION<br>Classification setting conditions: Particle Size for Overflow is determined by a setting between 1 μm or less and 2 μm or less |
| Magnetic concentration | "High Gradient Magnetic separator; Model Number 120" manufactured by MESSO CORPORATION<br>Aperture of mesh for application of magnetic force: 50 [μm]<br>Magnetic field intensity: 12 kGauss |
| Particle-size measurement | Laser diffraction-type particle size distribution measuring apparatus "SALD-3100" manufactured by SHIMADZU CORPORATION<br>$d_{50}$ particle is used as the unit of particle size<br>$d_{50}$ particle size: Value measured by laser diffraction method |
| Dehydration according to superheated steam drying system | Oliver-type rotary drum-drier<br>Amount of leach residue adhered to filter cloth: 20 g/cm$^2$ · h<br>Pressure of superheated steam: 0.5 to 0.7 MPa<br>Temperature of superheated steam: 150 to 180° C. |

Example 1

The present invention was applied in separating a leach residue. As indicated in Table 1, the leach residue was first separated by the wet cyclone and subsequently the resultant overflow was physically separated using the magnetic separator.

The wet cyclone was adjusted to have a setting of 1 μm or less and the magnetic field intensity of the magnetic separator was 5 kGauss.

With respect to an amount of the solid content to be treated, the leach residues of 10 tons were treated to obtain the overflow slurry weight of 9.1 tons.

Moreover, the leach residue (overflow slurry; moisture content of 40% and solid content of 2.2 tons) obtained after being treated by the wet cyclone and the magnetic separator was charged into a superheated steam-type dehydrator (steam pressure: 0.6 MPa, temperature: 165° C.) and is then subjected to dehydration, thereby obtaining hematite cakes of 2.0 tons that indicate characteristics of the iron content of 52%, the sulfur content of 0.8%, and the moisture content of 15%.

Example 2

The present invention was applied in separating a leach residue. First, the leach residue was separated by the wet cyclone indicated in Table 1 and subsequently the resultant overflow was physically separated using the magnetic separator.

The wet cyclone was adjusted to have a setting of 2 μm or less and the magnetic field intensity of the magnetic separator was 20 kGauss.

With respect to the amount of the solid content to be treated, the leach residues of 10 tons were treated to obtain the overflow slurry weight of 9.3 tons.

Moreover, the leach residue (overflow slurry; moisture content of 40% and solid content of 2.4 tons) obtained after being treated by the wet cyclone and the magnetic separator was charged into a superheated steam-type dehydrator (steam pressure: 0.6 MPa, temperature: 165° C.) and was then subjected to dehydration, thereby obtaining hematite cakes of 2.3 tons that indicate characteristics of the iron content of 55%, the sulfur content of 0.9%, and the moisture content of 15%.

Comparative Example 1

The treatment was performed in the same operations as in Example 1 except that the present invention was not applied and a normal filter press (compression pressure; 2.0 MPa, temperature; 25° C.) was used in the dehydration process described above.

As a result, it was possible to obtain hematite cakes of 2.0 tons that indicate characteristics of the iron content of 52% and the sulfur content of 0.8%, but the moisture content was as insufficient as 22%.

Comparative Example 2

The treatment was performed in the same operations as in Example 1 except that the present invention was not applied and a high-pressure filter press (high-pressure pressurizing filtration apparatus: compression pressure; 8.0 MPa, temperature; 25° C.) was used in the dehydration process described above.

As a result, it was possible to obtain hematite cakes of 2.0 tons that indicate characteristics of the iron content of 52% and the sulfur content of 0.8%, but the moisture content was as insufficient as 20%.

Then, the moisture content was reduced up to 15% when the dehydration treatment was repeatedly carried out three times. In this case, however, operation efficiency was deteriorated due to the repetitive dehydration treatment, and lifespan of a filter cloth also became a third by a simple calculation, which was insufficient.

Comparative Example 3

The treatment was performed in the same operations as in Example 1 except that the present invention was not applied and a centrifugal dehydrator was used in the dehydration process described above.

As a result, it was possible to obtain hematite cakes of 2.0 tons that indicate characteristics of the iron content of 52% and the sulfur content of 0.8%, but the moisture content was as insufficient as 20%.

The invention claimed is:

1. A process for producing hematite for ironmaking that utilizes a leach residue as a raw material, the leach residue being obtained from a hydrometallurgical refining plant where a nickel oxide ore is treated by a high pressure acid leach process, the process for producing hematite comprising at least the following three steps in sequence:
    a separation step of separating the leach residue into an overflow and an underflow by a wet cyclone so that particles of a selected size or smaller than the selected size are separated into the overflow, and particles greater than the selected size separated into the underflow, the selected size being selected from a range of 1-2 μm;
    a physical separation step of separating the overflow into a strong magnetic substance and a weak magnetic substance with magnetic force using a strong-magnetic-field magnetic separator under a condition such that magnetic field intensity is 5 to 20 kGauss; and
    a dehydration step of using a superheated steam drying system for adjusting the moisture content of the strong magnetic substance of the overflow after the physical separation step, to be 10% to 17% by weight, thereby producing a hematite cake.

2. The process for producing hematite for ironmaking according to claim 1, wherein the moisture content of the strong magnetic substance of the overflow after the physical separation step is 35% to 45% by weight, and
    a pressure of superheated steam in the superheated steam drying system is 0.5 MPa to 0.7 MPa and a temperature of the superheated steam is 150° C. to 180° C.

3. The process for producing hematite for ironmaking according to claim 2, wherein the wet cyclone is adjusted in the separation step to have a setting of 1 μm or less as a classification particle size for the overflow.

4. The process for producing hematite for ironmaking according to claim 1, wherein the wet cyclone is adjusted in the separation step to have a setting of 1 μm or less as a classification particle size for the overflow.

* * * * *